(12) United States Patent
Gestermann

(10) Patent No.: US 6,368,490 B1
(45) Date of Patent: Apr. 9, 2002

(54) METHOD FOR ELECTROCHEMICALLY PROCESSING HCL GAS INTO HIGHLY PURE CHLORINE

(75) Inventor: Fritz Gestermann, Leverkusen (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/581,410

(22) PCT Filed: Dec. 8, 1998

(86) PCT No.: PCT/EP98/07974

§ 371 Date: Jun. 12, 2000

§ 102(e) Date: Jun. 12, 2000

(87) PCT Pub. No.: WO99/31297

PCT Pub. Date: Jun. 24, 1999

(30) Foreign Application Priority Data

Dec. 15, 1997 (DE) .......................... 197 55 636

(51) Int. Cl.$^7$ ................................. C25C 1/02
(52) U.S. Cl. .................. 205/620; 205/621; 205/763
(58) Field of Search ................. 205/618, 620, 205/621, 763

(56) References Cited

U.S. PATENT DOCUMENTS 2,719,822 A   10/1955  Kassel
3,434,948 A   3/1969   Hooker et al.
3,799,860 A   3/1974   Gritzner et al.
4,222,833 A   9/1980   Carlson
4,247,532 A   1/1981   Saletan et al.
4,294,815 A * 10/1981  Lohrberg et al. ........... 423/478
4,320,179 A   3/1982   Hart
5,411,641 A   5/1995   Trainham, III et al.
5,770,035 A   6/1998   Faita

FOREIGN PATENT DOCUMENTS

| DE | 1163785  | 9/1964  |
| FR | 1438213  | 12/1966 |
| WO | 95/14797 | 6/1995  |
| WO | 96/34998 | 11/1996 |

OTHER PUBLICATIONS

Patent Abstracts of Japan, C709, Apr. 13, 1990, vol. 14, No. 184, "Method for Electrolyzing Hydrochloric Acid and Formation of Hydrochloric Acid".

* cited by examiner

Primary Examiner—Kathryn Gorgos
Assistant Examiner—Wesley A. Nicolas
(74) Attorney, Agent, or Firm—Joseph C. Gil; Diderica van Eyl

(57) ABSTRACT

A method is described for the electrochemical processing of HCL gas to high-purity chlorine in which the process of an HCL gas-phase electrolysis with purified HCL gas from, for example, chemical reactions is coupled to a hydrochloric acid electrolysis with dilute hydrochloric acid, with the use if desired of a consumable oxygen cathode.

11 Claims, 1 Drawing Sheet

METHOD FOR ELECTROCHEMICALLY PROCESSING HCL GAS INTO HIGHLY PURE CHLORINE

FIELD OF THE INVENTION

The invention relates to a method for the electrochemical processing of HCl gas to high-purity chlorine in which HCl gas-phase electrolysis is combined with hydrochloric acid electrolysis, with or without a consumable oxygen cathode, to form an HCl recycling unit.

BACKGROUND OF THE INVENTION

HCl gas, a by-product of numerous different chemical reactions, is commonly converted to chlorine gas which can then be passed back into the production cycle again. In one known such method HCl gas is converted to chlorine gas by gas-phase electrolysis. The resulting chlorine gas, however, always still contains a certain amount of HCl gas which has not undergone fall conversion. The HCl gas is separated from the chlorine gas by technology which is known in principle. In the course of high-pressure liquefaction, cooling results in the production not only of the purified liquid chlorine but also of the HCl gas as "overhead gas". High-pressure distillation of the liquid chlorine expels further residues of HCl gas from the chlorine. The gas-phase electrolysis of hydrogen chloride to chlorine gas is described, for example, in the patent specification U.S. Pat. No. 5,411,641.

The known separation method described above has the disadvantage that owing to the cooling and reheating operations the separation of the HCl gas from the chlorine is highly energy-intensive and complicated and that the separation of HCl is incomplete. In addition, it is impossible to avoid handling relatively large amounts of liquid chlorine in order actually to be able to start the process which results in hydrogen chloride as a by-product. The alternative—a hydrogen chloride liquid gas storage facility—is even less attractive, since in that case even higher pressures must be employed in order to liquefy the HCl gas.

EP 785 294 A1 describes an electrolytic method in which aqueous hydrochloric acid having a maximum concentration of 20% is reacted anodically to chlorine gas in a membrane electrolysis cell. This reaction is operated cathodically with a consumable oxygen cathode. The current density which can be achieved in continued operation of this method is limited to about 4 kA/m$^2$.

On the basis of the above-described prior art, therefore, there is a need for a simple method of processing HCl gas to elemental chlorine which avoids the complicated liquefaction of HCl and/or chlorine, can be operated with a considerably higher current density, is more favourable in terms of energy consumption, and, moreover, can easily be coupled onto any other continuous processes where HCl gas is obtained as a product.

SUMMARY OF THE INVENTION

The object is achieved in accordance with the invention by a method for the electrochemical processing of HCl gas to high-purity chlorine which forms the subject of the invention and is characterized in that the HCl gas is reacted in a first gas-phase electrolysis stage to give a chlorine gas which comprises HCl gas, in that the HCl-comprising chlorine gas is scrubbed extractively in a second stage of a with depleted liquid hydrochloric acid as the absorbent, to form enriched hydrochloric acid, so freeing the chlorine gas from the HCl gas, in that the enriched hydrochloric acid is broken down in a third stage of liquid-phase electrolysis into chlorine gas, with formation of depleted hydrochloric acid, and, especially when using a consumable oxygen cathode, to form chlorine gas and water, in that the depleted hydrochloric acid is passed back into the absorption stage and in that the chlorine streams generated in the gas-phase electrolysis stage and in the liquid-phase electrolysis stage are drawn off, combined if desired and dried if desired.

The chlorine streams can subsequently be passed again to a chlorine-consuming chemical process.

DESCRIPTION OF THE FIGURES

These and other features, aspects, and advantages of the present invention will become better understood with reference to the following description and appended claims, where

DESCRIPTION OF THE INVENTION

Figure 1:
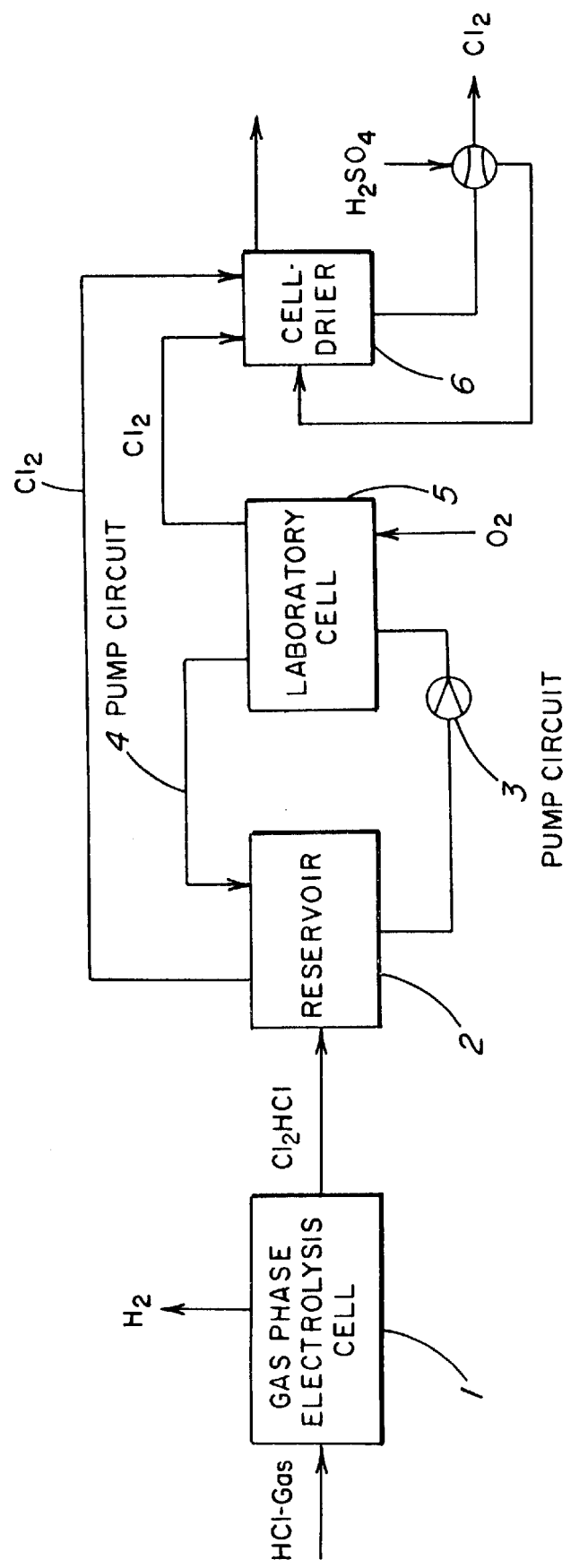
FIG. 1 is a diagram that illustrates an embodiment of the invention.

Purified HCl gas, which is obtained, for example, as a by-product of numerous chemical processes, such as the manufacture of isocyanate or polycarbonate, is reacted in a first stage at very high current densities to form chlorine and hydrogen. The reaction can be operated at high yields with low pressures or even at atmospheric pressure. The chlorine produced by the reaction is freed from unreacted HCl gas fractions in a relatively small HCl absorption unit. This absorption unit is connected in a circuit to a downstream hydrochloric acid electrolysis stage with a consumable oxygen cathode, or to an electrolysis stage which generates chlorine and hydrogen and which is known, in principle, from the prior art. In this stage, thin hydrochloric acid with a concentration, in particular, of 12–14% (e.g. the anolyte from the downstream electrolysis), is passed countercurrent to the HCl-comprising chlorine gas, so that the enriched, high chlorine-content hydrochloric acid can be passed to the second electrolysis stage. The chlorine gas, which is wet but virtually free of HCl owing to its subsequent purification with the low-strength hydrochloric acid, can be passed on as a first substream for drying. Owing to the method it is free of oxygen.

The products of the gas-phase electrolysis stage and/or the liquid-phase electrolysis stage preferably include not only chlorine but also either hydrogen or water.

The HCl fraction not reacted: in the first stage is reacted in the downstream hydrochloric acid electrolysis stage likewise to form high-purity chlorine (the chlorine content is at least 99.9%) which, together with the chlorine main stream from the first stage, can be freed from disruptive fractions of steam in a downstream drying stage.

In a preferred method, the liquid-phase electrolysis stage and/or the gas-phase electrolysis stage are/is operated with a consumable oxygen cathode.

In particular, the water which may be formed in the liquid-phase electrolysis stage in the case of the cathodic reaction is passed back into the hydrochloric acid circuit of the absorption stage.

In one variant of the method of the invention the electrolysis conditions in the gas-phase electrolysis stage are set such that the HCl conversion is from 40% to 90%.

A further preferred method is characterized in that the electrolysis conditions in the liquid-phase electrolysis stage are set such that the concentration of the depleted hydrochloric acid is from 5 to 19%, in particular from 12% to 14%, and the concentration of the enriched hydrochloric acid is from 6 to 20%, in particular from 13% to 15%, corresponding to the optimum attainable conductivity.

The amount of hydrogen generated in the first stage can be regulated by supplying a larger or smaller excess of HCl to the gas-phase electrolysis. As the level of the excess increases, increasingly more favourable electrolysis conditions are established and so the energy requirement for the possible hydrogen by-product falls. It is therefore possible to regulate the amount of hydrogen generated by operating in the second stage with the energy-saving consumable oxygen cathode.

A product of the second electrolysis stage, in particular as a by-product of the reaction of the cathodically reduced oxygen with the protons that pass through the membrane, is water, which is obtained in the form of weak hydrochloric acid (<1%). Some of this water can be passed back into the hydrochloric acid circuit to compensate for the fractions of water discharged with the chlorine and through the membrane. As a result, net losses of chlorine/HCl remain low. In addition it is also possible by this means to compensate losses from the catholyte circuit of the gas-phase electrolysis which are associated with the separation of the hydrogen.

The drying of the chlorine takes place in a procedure comprising, for example, two stages. The initial drying can be carried out in a column with dilute sulphuric acid, whereas the subsequent drying can take place in a blower configured as a liquid ring pump, which for this purpose is fed with concentrated sulphuric acid. The sulphuric acid discharged at this stage then feeds the abovementioned column. The concentrated sulphuric acid can of course be fed into a secondary-drying column in accordance with the method known from the prior art.

In this variant the blower merely has the function of overcoming the pressure losses to the chemical plant which is upstream in the circuit. In view of the excellent chlorine quality obtained with the method according to the invention, the otherwise customary chlorine compression and liquefaction stages can be omitted.

The run-up buffer for the supply of chlorine to the main plant is preferably the store of the hydrochloric acid circuit of the second stage, which for this purpose must be dimensioned appropriately. Chlorine from the hydrochloric acid electrolysis can be used to start the main plant initially. HCl gas obtained here can first of all be fed directly into the absorption of the second stage until the rising production produces sufficient HCl gas to start the first stage.

If at a particular site it is not possible to deploy the resulting hydrogen for chemical purposes, the first stage can also be operated with a consumable oxygen cathode, which constitutes a further marked energy saving.

Further advantages of the method of the invention are as follows:

Relative to conventional HCl recycling processes, the novel method has a lower overall energy requirement. The method produces an excellent chlorine quality (the purity being, in particular, greater than or equal to 99.9%). The method does not involve any laborious cleaning processes. The proportion of hydrogen in the product can be controlled within certain limits, down to zero if desired. Through the construction of a highly compact first stage (about ⅓ of the electrode and membrane surface area of conventional electrolyses), which according to trials to date can be operated at atmospheric pressure up to 12 kA/m$^2$, and by virtue of markedly reduced absorption, it is possible, relative to conventional electrolysis, to achieve a less complicated construction and hence lower capital costs.

The method features very low net losses of chlorine. Little waste water is produced from water of reaction and from transportation through the membrane, as weak (<1%) hydrochloric acid, and the NaOH consumption for water purification is small, since the catholyte in the first stage is operated merely as approximately 1-normal hydrochloric acid and the catholyte pressure is higher than the HCl gas pressure on the anode side, so that chlorine impurities in the hydrogen are unlikely.

The plant for operating the method of the invention can be operated, advantageously, with high flexibility as an auxiliary plant for any desired chlorine-consuming chemical process.

In a preferred variant of the method, the method is started with the liquid-phase electrolysis in order to form chlorine gas for any desired chemical process in which chlorine gas is employed and HCl gas is formed. The HCl gas obtained from the attached chemical process is first of all guided past the first stage, the gas-phase electrolysis, and passed directly into the absorption stage. It is fed into the first stage, the gas-phase electrolysis, only when the amount of HCl gas produced is large enough to obtain satisfactory operating conditions here.

The invention is elucidated in more detail below by way of example with reference to FIG. 1. The invention is further described in the following illustrative examples in which all parts and percentages are by weight unless otherwise indicated.

EXAMPLES

A gas-phase electrolysis cell 1 operated at atmospheric pressure and with an active surface area of 109 cm$^2$ is connected, via a reservoir 2 with dilute hydrochloric acid for the passage of the product gas and for the adsorption of the residual HCl content, to the anolyte chamber of a laboratory cell 5 which operates with a consumable oxygen cathode having an active surface area of 30 cm$^2$.

The temperature in the gas-phase electrolysis cell 1 was kept constant at 78° C. via a heat exchanger with the aid of the catholyte acid (approximately 1-normal hydrochloric acid) in a pump circuit 3, 4. The concentration of the acid in the anolyte circuit of the cell 6 with a consumable oxygen cathode was held in the range from 12 to 14% HCl by adjusting the current density in this cell in each case such that the amount of HCl absorbed in the reservoir was converted in the hydrochloric acid electrolysis with the consumable oxygen cathode. The temperature in this circuit 3, 4 was kept constant at 57° C. by means of a heat exchanger.

The conversions in the gas-phase electrolysis 1 were determined by analysing product gas obtained by means of sampling; the incoming amount of HCl was measured with a rotameter. The two chlorine streams were combined in the drier 6, and the initial chlorine concentration was determined.

The by-products of the reaction—hydrogen from the gas-phase electrolysis and water of reaction and condensate from the cell 5 with the consumable oxygen cathode—were discarded.

The results shown in Table 1 were achieved in three runs. In the existing arrangement, with higher current densities, it was possible to achieve a conversion of only 45% in the gas-phase electrolysis without a disproportionate increase in the voltage.

TABLE 1

| | Current density in cell 1 I (kA/m$^2$) | Voltage in cell 1 U (V) | HCl conver -sion (%) | Current density in cell 2 I (kA/m$^2$) | Voltage in cell 2 U (V) | Initial chlorine concen- tration (% total) |
|---|---|---|---|---|---|---|
| Run 1 | 6 | 1.60 | 83 | 2.8 | 1.18 | 99.9 |
| Run 2 | 8 | 1.68 | 76.5 | 3.6 | 1.27 | 99.8 |
| Run 3 | 10 | 1.73 | 84 | 4.4 | 1.36 | >99.9 |

Although the present invention has been described in detail with reference to certain preferred versions thereof, other variations are possible. Therefore, the spirit and scope of the appended claims should not be limited to the description of the versions contained therein.

What is claimed is:

1. A method for the electrochemical processing of HCl gas to high-purity chlorine comprising
    A) reacting HCl gas in a gas-phase electrolysis stage to give a chlorine gas which contains HCl gas,
    B) scrubbing the HCl-containing chlorine gas extractively in an absorption stage with depleted liquid hydrochloric acid as an absorbent, thereby forming enriched hydrochloric acid and freeing chlorine gas from the HCl gas,
    C) converting the enriched hydrochloric acid in a liquid-phase electrolysis stage into chlorine gas, and forming depleted hydrochloric acid, and
    D) passing the depleted hydrochloric acid back into the absorption stage; wherein chlorine streams generated in the gas-phase electrolysis stage and in the liquid-phase electrolysis stage are drawn off.

2. The method of claim 1, wherein products formed in addition to chlorine gas in the gas-phase electrolysis stage and/or in the liquid-phase electrolysis stage are hydrogen or water.

3. The method of claim 1, wherein the liquid-phase electrolysis stage is operated with a consumable oxygen cathode.

4. The method of claim 2, wherein HCl-containing water obtained in a cathodic reaction in the liquid-phase electrolysis stage is passed back into the hydrochloric acid of the absorption stage.

5. The method of claim 1, wherein the gas-phase electrolysis is operated with a consumable oxygen cathode.

6. The method of claim 1, wherein the HCl conversion in the gas-phase electrolysis stage is from about 40% to about 90%.

7. The method according of claim 1, wherein the concentration of the depleted hydrochloric acid from the liquid-phase electrolysis stage is from about 5% to about 19% and the concentration of the enriched hydrochloric acid is from about 6% to about 20%.

8. The method according of claim 1, wherein the concentration of the depleted hydrochloric acid from the liquid-phase electrolysis stage is from about 12% to about 14% and the concentration of the enriched hydrochloric acid is from about 13% to about 15%.

9. Method according to one of claim 1, wherein the method is started with the liquid-phase electrolysis stage in order to form chlorine gas as a starting material for any chemical process in which HCl gas is formed and the HCl gas obtained from the attached process is fed into the gas-phase electrolysis stage.

10. The method of claim 1, wherein the chlorine streams drawn off from the gas-phase electrolysis stage and the liquid-phase electrolysis stage are combined.

11. The method of claim 1, wherein the chlorine streams drawn off from the gas-phase electrolysis stage and the liquid-phase electrolysis stage are dried.

* * * * *